United States Patent
Fuerst et al.

(10) Patent No.: US 10,017,140 B2
(45) Date of Patent: Jul. 10, 2018

(54) BUMPER MODULE

(71) Applicant: GM GLOBAL TECHNOLOGY OPERATIONS LLC, Detriot, MI (US)

(72) Inventors: Fabian Fuerst, Ruesselsheim (DE); Tommy Hechtel, Ruesselsheim (DE); Theobald Hock, Ruesselsheim (DE); Stefan Holderried, Ruesselsheim (DE)

(73) Assignee: GM GLOBAL TECHNOLOGY OPERATIONS LLC, Detriot, MI (US)

( * ) Notice: Subject to any disclaimer, the term of this patent is extended or adjusted under 35 U.S.C. 154(b) by 0 days.

(21) Appl. No.: 15/410,297

(22) Filed: Jan. 19, 2017

(65) Prior Publication Data

US 2017/0203707 A1    Jul. 20, 2017

(30) Foreign Application Priority Data

Jan. 19, 2016 (DE) .......................... 10 2016 000 515

(51) Int. Cl.
*B60R 19/03* (2006.01)
*B60R 19/34* (2006.01)

(52) U.S. Cl.
CPC .............. *B60R 19/03* (2013.01); *B60R 19/34* (2013.01)

(58) Field of Classification Search
CPC . B60R 19/03; B60R 19/34; B60R 2019/1846; B60R 2019/1853; B60R 2019/186; B60R 2019/1866
USPC .................................................. 293/102, 133
See application file for complete search history.

(56) References Cited

U.S. PATENT DOCUMENTS

| | | | |
|---|---|---|---|
| 3,869,167 A | 3/1975 | Muller | |
| 4,542,925 A * | 9/1985 | Huber | B60R 19/18 293/109 |
| 5,577,784 A * | 11/1996 | Nelson | B60R 19/18 293/120 |
| 6,286,879 B1 * | 9/2001 | Haque | B60R 19/03 293/102 |
| 6,406,079 B2 | 6/2002 | Yamada et al. | |
| 6,540,275 B1 * | 4/2003 | Iwamoto | B60R 19/12 293/109 |
| 6,997,490 B2 | 2/2006 | Evans et al. | |
| 7,131,674 B2 | 11/2006 | Evans et al. | |
| 7,172,227 B2 | 2/2007 | Weissenborn et al. | |
| 7,560,003 B2 | 7/2009 | Naughton et al. | |
| 7,842,360 B2 | 11/2010 | Peters et al. | |
| 7,879,435 B2 | 2/2011 | Mett et al. | |
| 8,950,802 B2 | 2/2015 | Hasl | |

(Continued)

FOREIGN PATENT DOCUMENTS

| | | |
|---|---|---|
| DE | 10354723 A1 | 6/2005 |
| DE | 102009035777 A1 | 2/2011 |

(Continued)

OTHER PUBLICATIONS

German Patent Office, German Search Report for German Application No. 102016000515.7, dated Nov. 21, 2016.

(Continued)

*Primary Examiner* — Gregory A Blankenship
(74) *Attorney, Agent, or Firm* — Lorenz & Kopf, LLP

(57) ABSTRACT

A bumper module for a vehicle has a cross member including at least one shell made of fiber-reinforced plastic which is stiffened by plastic material, in particular ribs, injection molded between mutually opposite walls of the shell.

14 Claims, 2 Drawing Sheets

(56) References Cited

U.S. PATENT DOCUMENTS

| | | | |
|---|---|---|---|
| 9,302,638 B2 | 4/2016 | Mana et al. | |
| 2003/0047952 A1* | 3/2003 | Trappe | B60R 19/18 293/120 |
| 2006/0029809 A1 | 2/2006 | Grefenstein et al. | |
| 2006/0131901 A1* | 6/2006 | Nguyen | B60R 19/18 293/120 |
| 2010/0109354 A1* | 5/2010 | Agrahari | B60R 19/18 293/120 |
| 2012/0104775 A1* | 5/2012 | Marur | B60R 19/18 293/120 |
| 2012/0141764 A1 | 6/2012 | Lee et al. | |
| 2012/0315429 A1* | 12/2012 | Stamp | B29C 70/028 428/72 |
| 2013/0119683 A1* | 5/2013 | Blumel | B21D 53/88 293/133 |
| 2013/0175813 A1* | 7/2013 | Mana | B60R 19/18 293/120 |
| 2014/0203578 A1* | 7/2014 | Kaneko | B60R 19/34 293/133 |
| 2014/0333077 A1* | 11/2014 | Kil | B60R 19/03 293/132 |
| 2014/0367982 A1* | 12/2014 | Kano | B60R 19/18 293/121 |
| 2015/0015006 A1* | 1/2015 | Yabu | B60R 19/03 293/120 |
| 2015/0061320 A1* | 3/2015 | Yabu | B60R 19/18 296/187.1 |
| 2016/0001722 A1 | 1/2016 | Nickel et al. | |
| 2016/0001723 A1 | 1/2016 | Oku et al. | |
| 2016/0046248 A1 | 2/2016 | Fuerst et al. | |
| 2016/0089817 A1 | 3/2016 | Hundley et al. | |
| 2016/0144815 A1* | 5/2016 | Harris | B60R 19/34 293/142 |
| 2017/0036624 A1* | 2/2017 | Yabu | B60R 19/03 |
| 2017/0106822 A1* | 4/2017 | Steinebach | B60R 19/03 |

FOREIGN PATENT DOCUMENTS

| | | |
|---|---|---|
| DE | 102009036717 A1 | 2/2011 |
| EP | 0370342 A2 | 5/1990 |
| EP | 1997689 A1 | 12/2008 |
| JP | S62149537 A | 7/1987 |
| KR | 20160086101 A | 7/2016 |
| WO | 03104030 A2 | 12/2003 |

OTHER PUBLICATIONS

A.T. Beyene, E.G. Koricho, G. Belingardi, B. Martorana, Design and Manufacturing Issues in the Development of Lightweight Solution for a Vehicle Frontal Bumper, International Symposium on Dynamic Response and Failure of Composite Materials (2014).

Great Britain Patent Office, Great Britain Search Report for Great Britain Application No. GB1700533.1, dated Jul. 3, 2017.

* cited by examiner

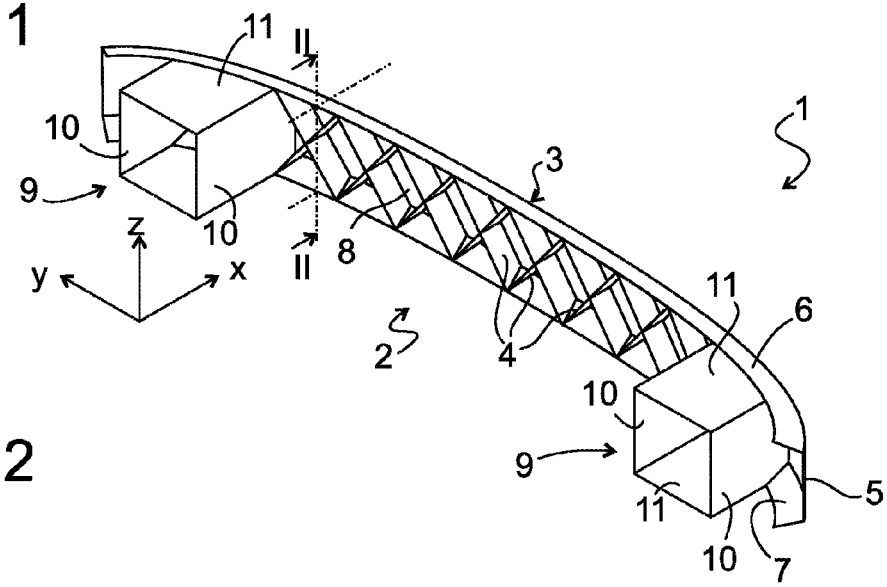
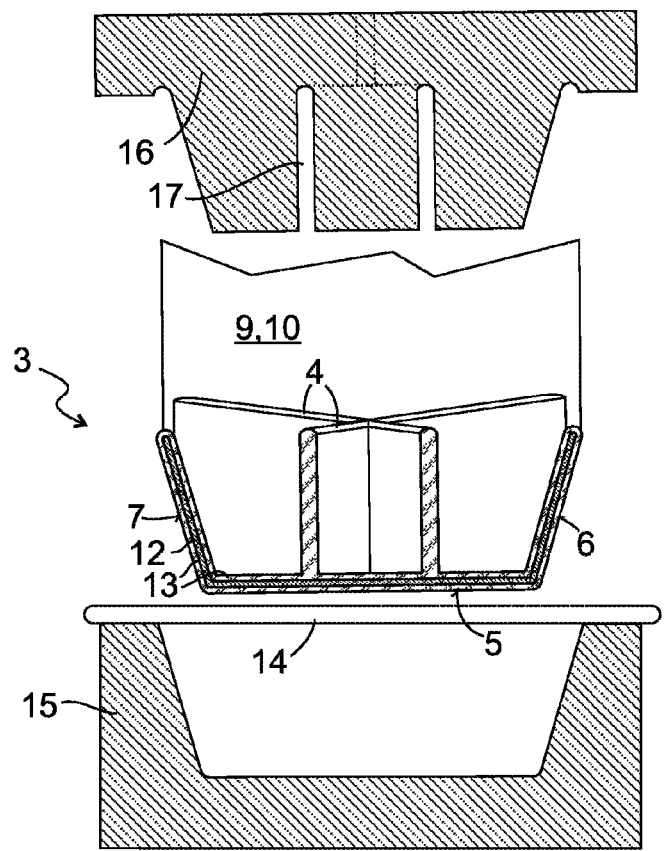

BUMPER MODULE

CROSS-REFERENCE TO RELATED APPLICATION

This application claims priority to German Patent Application No. 102016000515.7, filed Jan. 19, 2016, which is incorporated herein by reference in its entirety.

TECHNICAL FIELD

The present disclosure pertains to a bumper module for a vehicle, in particular a road vehicle, having at least one cross member including at least one shell made of fiber-reinforced plastic.

BACKGROUND

Bumper are used on a vehicle to minimize or eliminate damage as a result of the collision of the vehicle with another vehicle or with a fixed object. In the design of such bumper structures, there is a need to provide a bumper module which has a high load-bearing capacity with low weight and nevertheless is efficient and cost-effective to manufacture.

SUMMARY

The present disclosure provides a bumper module for a vehicle having a cross member including at least one shell made of fiber-reinforced plastic. The cross member is stiffened by plastic material injection molded between mutually opposite walls of the shell. Such a structure makes it possible to manufacture the shell by deep drawing from flat material. At the same time, it is possible to achieve a load-bearing capacity of the cross member which cannot be achieved with the shell made of fiber-reinforced plastic alone. The plastic material should preferably be molded to ribs connecting the walls to achieve a high increase in load-bearing capacity with low weight.

The present disclosure also provides a crash box injection-molded onto the shell together with the ribs or parts thereof. Therefore, the crash box can be injection-molded onto an open side of the shell. The walls of the crash box themselves can contribute to the stiffness of the cross member by connecting the walls of the shell to one another or crossing the ribs formed between the walls.

It is possible to mold them with a simple molding tool jointly in one operation if the ribs and the walls of the crash box are extended in the same direction. As a consequence of a second embodiment of the present disclosure, the crash box is injection-molded onto an outer side of one of the mutually opposite side walls of the shell.

In one embodiment, the shell can be open in the vertical direction. Preferably the shell is open towards the bottom to prevent moisture or dirt from being able to collect in the shell. Here also the ribs and the walls of the crash box can be extended in the same direction. In particular, the crash box can include a plurality of vertical walls which delimit open recesses in the vertical direction.

At least one part of the crash box can also be injection-molded onto an outer side of the cross member such as a side facing away from the longitudinal members in the state mounted on the vehicle. This is meaningful when the cross member is highly curved in order to be supported with sufficient stiffness on the longitudinal members.

The fibers of the fiber-reinforced plastic are preferably structured as woven fabric or interlaid scrim. Such fibers, other than disordered fibers of a nonwoven fabric or the fibers of a material which can be processed by injection molding, cannot yield to a tensile loading by straightening. Thus, a woven fabric or interlaid scrim reinforced plastic is highly resistant to tensile loading and a small wall thickness is sufficient to impart the required load-bearing capacity to the cross member.

The matrix of the fiber-reinforced plastic is preferably selected so that it is soft at the processing temperature of the injection-molded plastic material. In particular, the same thermoplastic material can be used both as matrix and as injection-molded material. Thus, an intrinsic material-bonded connection of the injection-molded plastic material can be created with the shell.

BRIEF DESCRIPTION OF THE DRAWINGS

The present disclosure will hereinafter be described in conjunction with the following drawing figures, wherein like numerals denote like elements.

FIG. 1 shows a perspective view of a bumper module;

FIG. 2 shows a section through the cross member of the bumper module;

DETAILED DESCRIPTION

Figure 3:
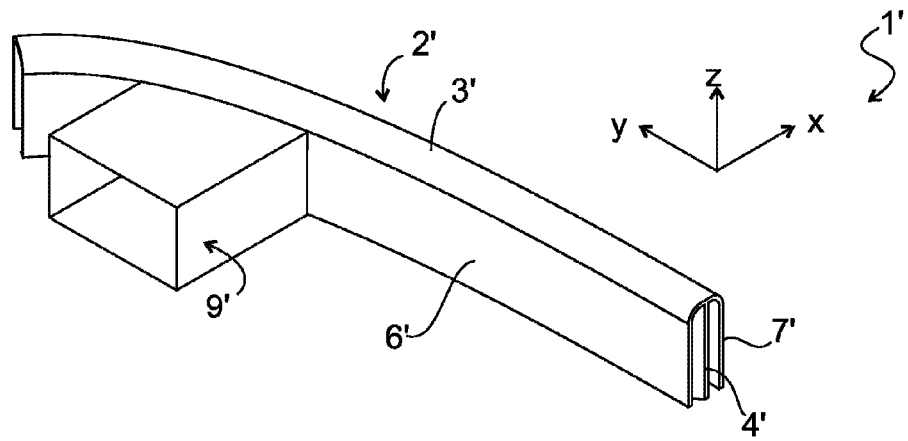
FIG. 3 shows a perspective partial view of a bumper module according to a second embodiment.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a bumper module 1 according to a first embodiment of the present disclosure in perspective view. A cross member 2 of the bumper module 1 includes an elongated shell and ribs 4 which stiffen the shell 3. The shell 3 includes a vertical wall 5 and sloping walls 6, 7 which are angled oppositely with respect to one another in the same direction on the upper and lower edge of the vertical wall 5. The walls 5-7 delimit a channel 8 which is open towards the vehicle interior. The shell 3 is made of a fiber-reinforced plastic material such as, for example an organic sheet by thermoforming. The ribs 4 extend inside the channel 8 from one wall 6 to the other wall 7 and are fused at their edges both with the walls 6, 7 and the vertical wall 5. The ribs 4 extend in the vehicle longitudinal direction x, as well as along an angle bisector spanned by the vehicle transverse direction y and the vertical z.

Crash boxes 9 are configured in the form of rectangular ends which are open towards the vehicle interior and engage with their side facing away from the vehicle interior in the channel 8. Walls 10, 11 of the crash boxes 9 extend in each case in the x and z or in the x and y direction.

FIG. 2 shows a section through the bumper module 1 of FIG. 1 and through a molding tool used to produce it along a plane designated by II-II in FIG. 1. A layer of woven fabric 12, typically glass fiber fabric, embedded in a plastic matrix can be seen inside the shell 3. The woven fabric 12 is shown in FIG. 2 encased by a layer 13 having the same thermoplastic material as the matrix of the woven fabric layer. In practice, the woven fabric 12, unlike the view in FIG. 2, can extend, at least in places, as far as directly to the surface of the shell 3.

The intersecting ribs 4 having the same thermoplastic material as the matrix and are shown here as fused in one piece with the layer 13. The bumper module 1 is obtained by initially draping a blank 14 made of an organic sheet on a hollow mold 15 of a two-part molding tool. The blank 14, which is made ductile by heating, is drawn into the hollow mold 15 and pressed in with a die 16. When the hollow mold 15 and the die 16 tightly enclose the blank 14, plastic is injected into the grooves 17 of the die 16 to form the ribs 4 of the cross member 3 and the walls 10, 11 of the crash boxes 1. Since both the ribs 4 and the walls 10, 11 are extended in the x direction, the die 16 is sufficient to mold both.

The injection-molded plastic can also be fiber-reinforced but the fibers must be shorter than those of the woven fabric 11 in order to ensure the injection moldability of the plastic.

As presently preferred, the injected plastic is chemically identical to the matrix material of the blank 14 so that when the plastic is injected in molten form, the matrix of the blank 14 also begins to melt appreciably and an intrinsic material-bonded connection is formed between the walls of the shell 3 and the ribs 4 or the walls 10, 11.

FIG. 3 shows a bumper module 1' according to a second embodiment of the present disclosure, cut along the vehicle central plane. The shell 3' of the cross member 2' has a downwardly directed opening so that of the two mutually opposite walls 6', 7' of the shell 3', the one 6' is facing the vehicle interior and the other 7' is facing a bumper cladding not shown. At the end of the shell 3' which is cutaway in FIG. 3, a rib 4' which stiffens this in the interior can be seen in section.

A crash box 9' in the same form as crash box 9 shown in FIG. 1 is molded onto the wall 6'. The two walls 6', 7' located one behind the other in the vehicle longitudinal direction and connected rigidly by the ribs 4 give the cross member 2 according to this embodiment an extremely high bending stiffness even with small wall thickness.

In order to implement the bumper module 1', a molding tool with at least three parts is required. A first part includes a downwardly open channel into which the blank 14 is pressed so that the wall 7' abuts against one side of the channel and the wall 6' abuts against the other side. A second part is movable in the z direction in order, similarly to the die 16, to press the blank 13 into the channel and which has grooves for forming the ribs 4'. A third part which is movable in the x direction relative to the first and second part so that first and second part forms the outer sides and the third part forms the interior of the crash box 9.

Figure 4:
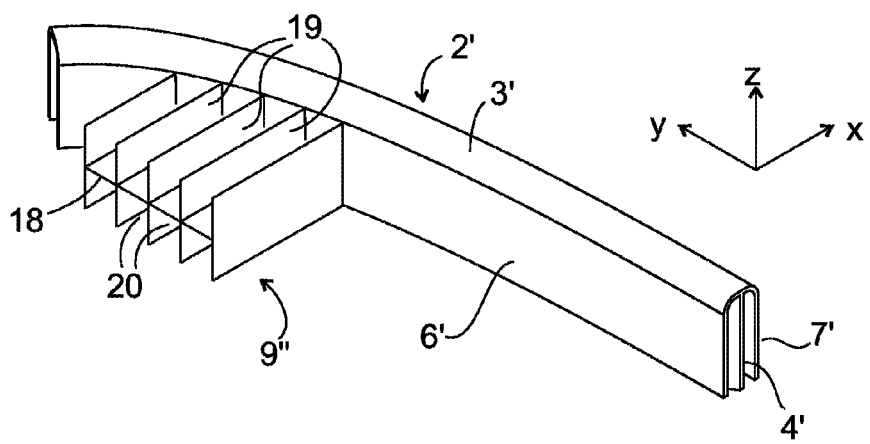
FIG. 4 shows a perspective partial view of a bumper module according to a third embodiment.

FIG. 4 shows another embodiment of the bumper module 1". The cross member 2' is here identical to that of FIG. 3, only the structure of the crash box is changed. The crash box 9" here includes a wall 18 extending in the x-y plane which is crossed by a plurality of walls 19 extending in the x-z plane. Recesses 20 between the walls 19 are open in the z direction so that in order to fabricate the bumper module 1", a two-part molding tool is again sufficient, a hollow mold which determines the outer cross-section of the cross member 2' and forms the upper side of the wall 18 and the upper halves of the walls 19, and a die which engages from below into the cross member 2' in order to form the ribs 4' and which forms the lower halves of the walls 19.

Figure 5:
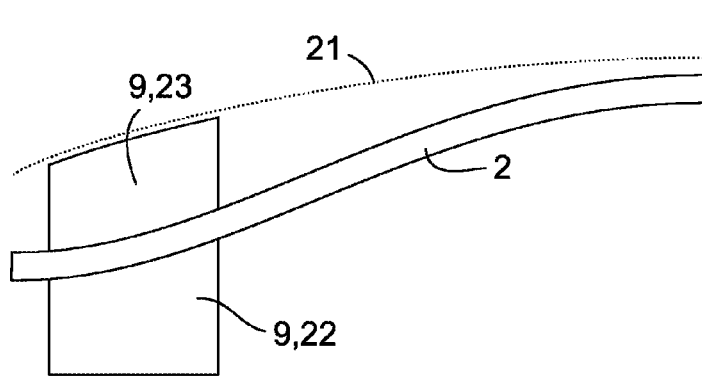
FIG. 5 shows a schematic plan view of a bumper module according to a fourth embodiment.

FIG. 5 shows a schematic plan view of one half of a bumper module according to a further embodiment of the present disclosure. In order to support a bumper cladding 21 in the center of the vehicle, far offset with respect to the two crash boxes 9, with the necessary strength, the cross member 2 of the bumper module is significantly more strongly curved than the bumper cladding 21. The crash box 9 is extended towards the front beyond the cross member 2 as far as the bumper cladding 21 to effectively support the bumper cladding 21 in the edges of the vehicle body in the event of a collision. The part 22 of the crash box 9 which lies between the cross member 2 and the bumper cladding 21 can have the same cross-sectional structure explained by reference to FIG. 2 or 4 as the part 23 lying between cross member 2 and longitudinal members of the vehicle and as described with reference to FIG. 2 or 4.

The parts 22, 23 can be molded like the crash box 9" in FIG. 4 with recesses open in the z direction or open in the x direction like those of FIG. 3. In the latter case, another part which is movable in the x direction is required to mold the front part 23. Since for a given overall length of the crash box, the stroke of the molding parts in the x direction for the two-part crash box of FIG. 5 can be considerably smaller than for the crash box of FIG. 3 which extends on only one side of the cross member 2, the thickness differences between regions of the walls of the crash box 9 in FIG. 5 adjacent to the cross member 2 and remote from the member are smaller than in FIG. 3 so that the usable length of the crash box 9 can be greater than in the case of FIG. 3. As a result of the two-part property, it can be largely avoided that wall regions of the crash box 9 are given a greater wall thickness for production technology reasons than that required for the dissipation of energy in the case of a collision. The weight of the crash box 9 can also be reduced with the same efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A bumper module for a vehicle comprising:
   a shell including a formed blank having a fiber layer embedded in a matrix of a thermoplastic material and a layer of the thermoplastic material encasing the formed blank, wherein the shell defines a first side wall, a second side wall and a third wall interconnecting the first and second side walls in a spaced relation; and
   at least one rib of the thermoplastic material extending from the third wall between the first and second side walls;
   wherein the layer and the at least one rib are co-molded with the formed blank to form a cross member in the bumper module.

2. The bumper module according to claim 1 further comprising an injection molded crash box having a side wall molded onto the third wall in a channel formed between the first and second side walls, wherein the crash box extends in the direction of the at least one rib.

3. The bumper module according to claim 1, wherein the fiber layer comprises a woven fabric.

4. The bumper module according to claim 1, wherein the at least one rib comprises a plurality of ribs extending from the front wall between the first and second side walls to form an angled crisscross pattern when viewed from a horizontal direction.

5. The bumper module according to claim 1, further comprising an injection molded crash box formed on the shell.

6. The bumper module according to claim 5, wherein the injection molded crash box extends from the third wall between the first and second walls.

7. The bumper module according to claim 5, wherein the injection molded crash box extends from the first wall of the shell.

8. The bumper module according to claim 7, wherein the shell is open in a vertical direction.

9. The bumper module according to claim 8 wherein the crash box comprises a plurality of vertical walls delimiting open recesses in the vertical direction.

10. The bumper module according to one of claims 7, wherein at least a part of the crash box is injection molded onto an outer side of the first wall.

11. The bumper module according to claim 1, wherein the fiber layer comprises an interlaid scrim.

12. The bumper module according to claim 8, wherein the shell is open on a bottom side of the shell.

13. A bumper module for a motor vehicle comprising:
a shell including a formed blank having a fiber layer embedded in a matrix of a thermoplastic material and a layer of the thermoplastic material encasing the formed blank, wherein the shell defines an upper side wall, a lower side wall and a front wall interconnecting the upper and lower side walls in a spaced relation;
a plurality of ribs extending from the front wall between the upper and lower side walls to form an angled crisscross pattern when viewed from a horizontal direction;
wherein the layer and the plurality of ribs are co-molded with the formed blank to form a cross member in the bumper module;
a first injection molded crash box formed near a first end of the cross member and having a first side wall molded onto the front wall in a channel formed between the upper and lower side walls, wherein the first crash box extends in the horizontal direction; and
a second injection molded crash box formed near a second end of the cross member opposite the first end and having a second side wall molded onto the front wall in the channel formed between the upper and lower side walls, wherein the second crash box extends in the horizontal direction.

14. A bumper module for a motor vehicle comprising:
a shell including a formed blank having a fiber layer embedded in a matrix of a thermoplastic material and a layer of the thermoplastic material encasing the formed blank, wherein the shell defines a front side wall, a rear side wall and a top wall interconnecting the front and rear side walls in a spaced relation; and
a rib of the thermoplastic material extending from the top wall between the front and rear wall;
wherein the layer and the rib are co-molded with the formed blank to form a cross member in the bumper module;
a first injection molded crash box formed near a first end of the cross member and having a first side wall molded onto the rear side wall, wherein the first crash box extends in a direction perpendicular to the rib; and
a second injection molded crash box formed near a second end of the cross member opposite the first end and having a second side wall molded onto the rear side wall, wherein the second crash box extends in the direction perpendicular to the rib.

* * * * *